United States Patent Office 3,260,606
Patented July 12, 1966

3,260,606
ENZYMATIC TREATMENT OF EGG
Shinzo Azuma, Yokkaichi, Japan, assignor to Taiyo Food Co., Ltd., Yokkaichi, Japan
No Drawing. Filed Apr. 29, 1964, Ser. No. 363,599
5 Claims. (Cl. 99—113)

The present invention relates to the enzymatic treatment of whole egg or its yolk and more particularly to enzymatic processing of whole egg or its yolk to obtain flavor-rich and non-thermally coagulative egg products.

Whole egg, its yolk and powder thereof are used, due to their emulsifying, leavening and nutritive properties, and their pleasant color and favorite flavour, as a material or additive for baked food, baby food, noodles, prepared cake mixes, salad dressing, etc.

However, egg proteins coagulate under certain conditions e.g. by heating at a temperature of 70° C. or higher or by being treated with certain chemical agents which are used in food processing industry. Furthermore, egg or its product is usually insoluble in water. Accordingly, the use of conventional egg or its products has been restricted because of the coagulation and its insolubility.

Accordingly it is a principal object of this invention to provide hydrolyzed egg or its product which is not thermally or chemically coagulative and is readily soluble in water.

Another object of this invention is to provide hydrolyzed egg or its product of the nature described and having more enhanced flavor than untreated one.

Another object of this invention is to provide hydrolyzed egg or its product which is more stable against oxidation than that in conventional egg or its product.

Still another object of this invention is to overcome various difficulties conventionally encountered in the treatment, processing and use of egg, its yolk and products thereof.

Other objects, advantages and features of this invention will be apparent from the following detailed description.

Briefly, these objects are accomplished according to this invention by treating whole egg or the yolk with an enzymatic system produced by the cultivation of a mould microorganism, at a pH between 3.5 and 5.0.

In carrying out the method of this invention any egg or its yolk may be used, but from a commercial point of view bird egg, particularly hen's egg, is preferable. Usually a whole egg (consisting of the white and yellow or yolk) is subjected to the enzymatic treatment, but if desired the yolk only may be similarly treated. If desired, an animal or vegetable protein such as soybean protein may be added thereto. The addition of such protein as soybean protein not only serves to destroy the fish-like smell or flavor peculiar to egg but also increases the protein content in the final product. The amount of such protein to be added is not critical and may be for example 0.1% to 5% (preferably about 0.2%–1%) based on the weight of the whole egg or yolk.

Before the enzymatic treatment it is preferable that the whole egg or yolk is made homogeneous. Therefore, it is preferable to thoroughly mixing by a suitable mechanical means such as homogenizer, homomixer or the like, and then filter (preferably through a 120 mesh filter) the same to assure the homogeneity and also to remove membrane and shell fragments. During the mixing operation, other protein such as soybean protein may be added, if desired.

The enzymatic treatment according to this invention must be conducted at a pH between 3.5 and 5.0, preferably from 3.8 to 4.8. Generally, a homogeneously mixed fresh whole egg liquid has a pH of about 8 and the yolk has a pH of about 6, and therefore it is necessary to adjust or lower the pH. For the pH adjustment any suitable acid, such as diluted hydrochloric acid, acetic acid, lactic acid, citric acid, maleic acid may be used. It is convenient to add the acid during the stage of mixing the whole egg or yolk as mentioned before.

An enzymatic system employed in this invention is obtained by the cultivation of fungi or moulds. As for the fungi, Aspergillus oryzae, Aspergillus niger and Rhizopus cinencis are most preferable, although other microorganisms belonging to Penicillium sp., Mucor sp., Manascus sp., etc. may also be used. In the cultivation of these microorganisms any known method may be used such as bran cultivation method which, usually, is conducted for about 3 days at a temperature of from 25° C. to 30° C. Methods for the cultivation of these microorganisms are well known in the art and the present invention is not restricted to any particular method of cultivation, it would be unnecessary to make more detailed explanation thereon.

A filtrate of a culture or an aqueous extract of a culture such as bran culture resulted from the cultivation may be used as an enzymatic in the form of an aqueous solution. However, it is preferable that the enzyme system is purified. This purification may be carried out in any suitable manner known in the art, such as salting out or precipitation by the addition of a suitable solvent, to remove undesirable impurities, color and odor. For example the filtrate or aqueous extract of a culture is added with about 30–70% by volume of ethanol to precipitate the enzymes, which are then collected and dried. In use, the solid enzymatic system may be dissolved in water. As known, the enzymatic system produced by these microorganisms and to be employed in this invention contains, in addition to protease, lipase, phospholipase, nucleic acid decomposing enzyme, and other known and unknown enzymes.

The important feature of the invention is in the treatment of the above mentioned whole egg or its yolk with such enzymatic system. It is preferable that an aqueous solution of the enzymatic system to be added to the whole egg or yolk liquid is also adjusted to a pH within the range specified above, that is between 3.5 and 5.0, preferably 3.8–4.8. The amount of the enzymatic system with respect to the whole egg or yolk to be treated is not critical and may be selected to be sufficient to attain the desired results (disappearance of thermal coagulative property mentioned before). The enzymatic treatment may be conducted at a temperature of from 30° C. to 45° C. The time of treatment may vary depending upon the amount of enzyme added and the temperature of the treatment. Generally, a treatment for about 12 to 72 hours is satisfactory. In any event, it is necessary to continue the treatment until the whole egg or yolk is rendered thermally non-coagulative.

It has been found that when this treatment is conducted with a specific pH range, namely 3.5–5.0 (more particularly 3.8–4.8), egg proteins are relatively rapidly decomposed or hydrolyzed into smaller molecule polypeptides, while the rate of amino acid formation is rather low, so that the whole egg or yolk is rendered thermally non-coagulative within a relatively short time. In contrast, when the enzymatic treatment is conducted at a lower or higher pH than the range specified, the formation of free amino acids is remarkable and the resulting product becomes bitter in taste. The enzymatic treatment within the specific pH range is unexpected in view of the fact that it has conventionally recognized that the optimum pH at which the treatment of phosphoprotein such as phosvitin with acid protease system is conducted should be 3.6 or 5.5.

In addition to the advantages that the whole egg or yolk is rendered thermally non-coagulative within a short time and without incurring bitter taste, the treatment of this invention has another advantage that the treated product has more enhanced egg yolk flavor than untreated one. It is assumed that this effect is obtained by the following reasons. The enzymatic system to be used in this invention contains not only protease but also a number of other enzymes, and the whole egg or egg yolk also contains not only protein but also oils, phosphatides, nucleic acids, etc., and various other unknown components which may be referred to as "flavor precursors" which, when treated with enzymes, are converted into flavor components exhibiting egg yolk like taste. Thus coreaction between the various enzymes and the various egg components result not only in the hydrolysis of protease but also formation of various flavor rich substances.

The acid added for the pH adjustment would serve also for preservation of the product against microorganism contamination. When a soybean protein is added to whole egg or yolk the protein is also hydrolyzed. In this case, undesired flavor of egg is destroyed presumably because of absorption of undesired components by the soybean protein hydroylzates.

After the enzymatic treatment, it is preferred to neutralize the mixture. For example, sodium hydroxide is added to the mixture to adjust the pH to 7.0. Before or after this neutralization, it is preferably to heat the mixture to inactivate the enzymes. It is also possible to add non-reducing sugar to render the mixture antiseptic. In any event, it is preferable to transfer the product of the enzymatic treatment to the subsequent processing as quickly and sanitarily as possible to avoid contamination.

Then the product is frozen for preservation. Alternatively, the product may be dried, e.g. by spray drying. In this case, it is preferable to add gum arabic (e.g. about 5% based on the weight of egg before the treatment) as a particle coating agent. The frozen or powdered product may be stored until usage. When sugar is added (e.g. about 60–65% by weight based on the liquid product), the resulting paste may be concentrated under heating (e.g. at 80° C. for 20 minutes, or at 85° C. for 5 minutes) and then poured into a can, which is then sealed. It is also possible to add desired additives such as coloring matter, vitamines, oils and/or other nutrients to the product before or after drying or pasting.

Since the product of this invention is readily soluble in water, thermally non-coagulative, rich in desired flavor, it may be used as food or it may be used as a material or ingredient together with other ingredients such as milk, sugar, etc. to produce new type of foods and drinks.

The invention will be further explained by referring to the following examples which are given only for illustration and not for limitation.

Example 1

Then grams of a dehydrated bran culture of *Rhizopus cinencia* was immersed in 10 times volume of water for 2 hours at room temperature. The filtrate or aqueous extract was filtered through a filter cloth. The filtrate was added with 40 cc. of a 95% ethanol while stirring for 30 minutes, and the precipitate was separated by centrifugation. The filtrate was again added with 160 cc. of a 95% ethanol and the precipitate was separated and collected, and washed with a 70% ethanol three times. Then the solid was dried in desiccator under vacuum. The dried enzyme powder was dissolved in 20 ml. of water and the solution was adjusted to pH 4.0 with 30% acetic acid.

Eggs were crushed and the shells were removed by hand. The whole egg (1 kg.) was treated by a homomixer and the pH was adjusted to 4.0 with 30% acetic acid.

The enzyme solution and egg liquid thus prepared were mixed together and the mixture was warmed at 40° C. for 22 hours for incubation while stirring. After the treatment, the mixture was neutralized to pH 7.0 with 6 N NaOH and then heated at 80° C. for 20 minutes for the inactivation of the enzymatic system. Then 250 g. of 20% gum arabic solution and 0.001 g. of $\beta$-carotene in 20 g. cotton seed oil were added and the mixture was treated by a homogenizer. The resulting paste was dried by a spray drier.

Example 2

Ten grams of a dehydrated wheat bran culture of *Aspergillus oryzae* were immersed in 10 times weight of water for 2 hours at room temperature. The slurry was filtered through a filter cloth and the filtrate was mixed with 40 cc. of a 95% ethanol. The mixture was centrifuged to separate the precipitate. The filtrate was added again with 160 cc. of a 95% ethanol and the precipitate formed was separated, collected, washed with 70% ethanol three times, and dried in a desiccator under vacuum. The dried enzyme powder was dissolved in 20 cc. of water and the solution was adjusted to pH 4.5 with 30% acetic acid.

Eggs were crushed and the shells were removed by hand. The whole egg (1 kg.) was treated by a homomixer to obtain a homogeneous liquid. Then 5 g. of water soluble soybean protein was added and the mixture adjusted to pH 4.5 with 30% acetic acid.

The enzyme solution and egg-soybean protein liquid thus prepared were mixed together, and the mixture was warmed at 40° C. for 22 hours for incubation. After the enzymatic treatment the mixture was neutralized to pH 7.0 with 6 N NaOH, and there was added 1.42 kg. of sugar while stirring. The mixture was heated at 85° C. for 5 minutes and the resulting paste was poured in can and sealed.

What I claim is:

1. A method for treating egg which comprises treating the egg with an enzymatic system produced by the cultivation of a mould microorganism, at a pH between 3.5 and 5.0 until the egg is rendered thermally non-coagulative.

2. A method as claimed in claim 1, wherein the egg is whole egg or its yolk.

3. A method as claimed in claim 1 wherein the microorganism is selected from fungi of *Aspergillus oryzae, Aspergillus niger, Rhzopus cinecis*, Penicillium sp., Mucor sp., and Monascus sp.

4. A method as claimed in claim 1 wherein the enzymatic treatment is carried out at a pH of from 3.8 to 4.8.

5. A method as claimed in claim 1 wherein the enzymatic treatment is carried out at temperature of from 30° C. to 45° C.

References Cited by the Examiner

UNITED STATES PATENTS 2,460,986  2/1949  Josh et al. _____ 99—210

A. LOUIS MONACELL, *Primary Examiner.*

L. M. SHAPIRO, *Assistant Examiner.*